United States Patent [19]

Saeki

[11] Patent Number: 4,809,060
[45] Date of Patent: Feb. 28, 1989

[54] HANGING DOT REDUCTION ARRANGEMENT

[75] Inventor: Tomoki Saeki, Yokohama, Japan

[73] Assignee: RCA Licensing Corporation, Princeton, N.J.

[21] Appl. No.: 94,774

[22] Filed: Sep. 10, 1987

[51] Int. Cl.⁴ .............................................. H04N 9/78
[52] U.S. Cl. ........................................ 358/31; 358/36
[58] Field of Search ................................... 358/31, 36

[56] References Cited

U.S. PATENT DOCUMENTS

| | | | |
|---|---|---|---|
| 4,178,609 | 12/1979 | Beutel | 358/31 |
| 4,240,105 | 12/1980 | Faroudja | 358/31 |
| 4,241,363 | 12/1980 | Maeyama et al. | 358/31 |
| 4,598,309 | 7/1986 | Casey | 358/31 |
| 4,616,254 | 10/1986 | Harwood et al. | 358/31 |
| 4,636,842 | 1/1987 | Hartmeier | 358/31 |
| 4,641,186 | 2/1987 | Pritchard | 358/105 |
| 4,734,758 | 3/1988 | Honjo | 358/31 |

FOREIGN PATENT DOCUMENTS

| | | | |
|---|---|---|---|
| 121889 | 7/1983 | Japan | 358/31 |
| 151592 | 8/1984 | Japan | 358/31 |
| 2054313 | 2/1981 | United Kingdom | 358/31 |

*Primary Examiner*—John W. Shepperd
*Attorney, Agent, or Firm*—Paul J. Rasmussen; Joseph J. Laks; Sammy S. Henig

[57] ABSTRACT

In a television apparatus, a line comb filtered first chrominance signal that is delayed by one horizontal interval and the line comb filtered first chrominance signal that is undelayed are formed from a baseband video input signal. A line comb filtered first luminance signal is also formed from the input signal. A signal that is representative of a difference between the chrominance signals is correlated with a high frequency signal component of the first luminance signal to form a control signal that controls a switching arrangement. The switching arrangement provides combed luminance and combed chrominance signals that are to be displayed in a video display. When the control signal is indicative of the corresponding signals being correlative, the switching arrangement provides, instead, corresponding uncombed signals so as to reduce the visibility of hanging dot condition.

21 Claims, 3 Drawing Sheets

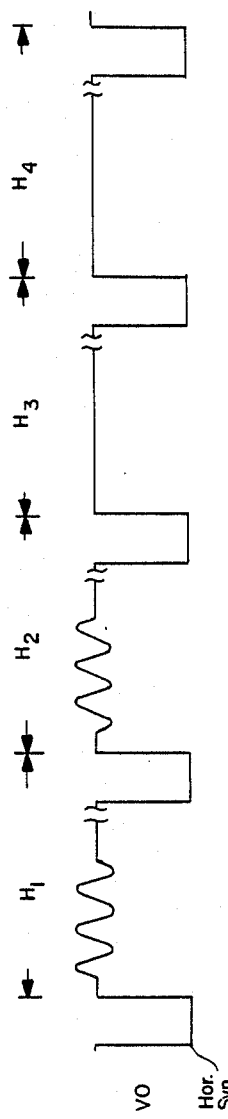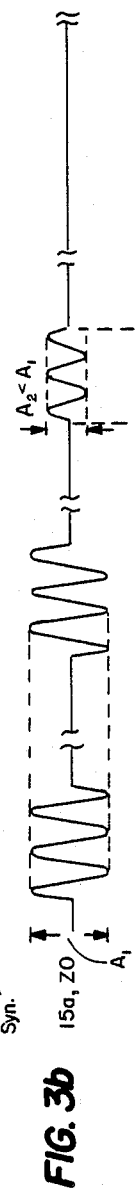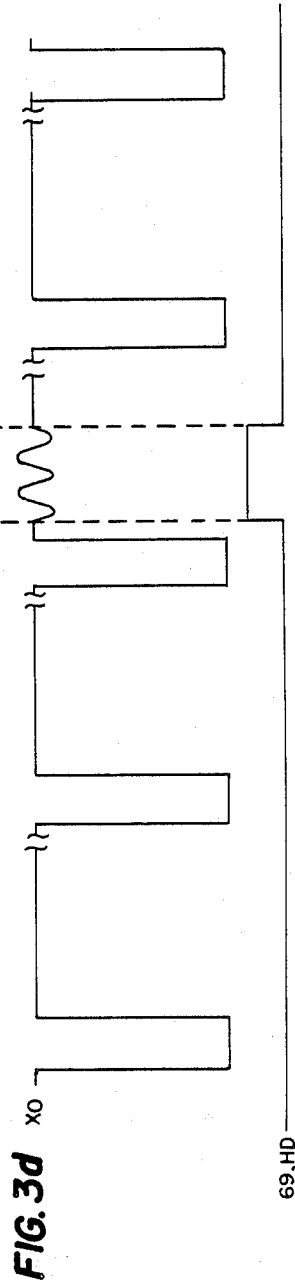
FIG.3a
FIG.3b
FIG.3c
FIG.3d
FIG.3e

HANGING DOT REDUCTION ARRANGEMENT

This invention relates generally to composite video signal processing apparatus of the type employing comb filter circuits to effect the separation of the luminance and chrominance components of the composite signal, and particularly to a system for use therein to effect reduction of picture disturbances, or artifact, of the so-called "hanging dot" type that may be associated with the comb filter operation.

The success of the separation function performed by typical forms of comb filters in color television receivers is dependent upon the existence of redundancy of picture information in adjacent regions of successive scan lines. For picture areas where a transition in the direction of the field scanning, hereinafter referred to as a vertical transition, occurs, the difference in picture information n adjacent regions of successive scan lines can result in imperfect performance of the separation function, with one consequently being the appearance of a chrominance component in the luminance signal output of the comb filter. If not removed, the interloping chrominance component will be reproduced as "hanging dots", i.e., as an undesirable array of dots extending across the region of the vertical transition in the displayed picture.

U.S. Pat. No. 4,616,254, entitled HANGING DOT REDUCTION in the name of L. Harwood, illustrates one prior art approach to the detection of "hanging dot" occurrences, wherein the indication of such an occurrence is developed by a signal multiplier responsive to chrominance signal and high frequency luminance signal outputs of comb filter apparatus. The signal multiplier apparatus of the aforesaid patent serves as a correlation indicator, relying upon a recognition of correlation between signal components in the respective outputs of the comb filter apparatus to identify "hanging dot" occurrences.

In the Harwood patent, the identification of "hanging dot" occurrences is carried out by employing a correlation indicator. The correlation indicator is illustrated as comprising a signal multiplier, a low pass filter and a voltage comparator. The signal multiplier functions to multiply the high frequency components of respective outputs of a comb filter. The products of multiplication developed by the signal multiplier are filtered by the low pass filter to develop a filtered multiplier output signal, which is subject to comparison with a threshold voltage in the voltage comparator. A hanging dot occurrence indicative signal is provided at the output terminal of the voltage comparator whenever the level of the filtered multiplier output signal exceeds the threshold voltage.

As long as the hanging dot occurrence indicative signal is generated, it causes the bandwidth of the output luminance signal to be reduced by selectively output switching from comb filtered luminance signal to low-pass filtered composite video signal. When the hanging dot indicative signal is not generated, reduction of the bandwidth ceases; consequently, the full bandwidth of the luminance channel is used to provide a high quality picture with sharp horizontal transition edges.

It may be desirable to prevent the generation of the hanging dot indicative signal when hanging dot condition does not occur so as to prevent unnecessary reduction of the bandwidth.

In accordance with an aspect of the invention, a television apparatus responsive to a baseband composite input signal generates an output luminance signal. A comb filter coupled to the input signal generates, in accordance with luminance information that is contained in the input signal, a first luminance signal that is comb filtered. First and second chrominance signals are generated in accordance with chrominance information that is contained in the input signal such that the second chrominance signal is time shifted, relative to the first chrominance signal. An inter-line chrominance difference signal is generated in accordance with differences between the first and second chrominance signals. A correlation indicative signal is generated when a signal that is generated in the comb filter is correlative with the inter-line chrominance difference signal. The output luminance signal is generated in accordance with the first luminance signal such that the correlation indicative signal causes the output luminance signal to vary.

FIGS. 3a–3e illustrate, schematically, waveforms useful for explaining the operation of the arrangement of FIG. 1.

Figure 1:
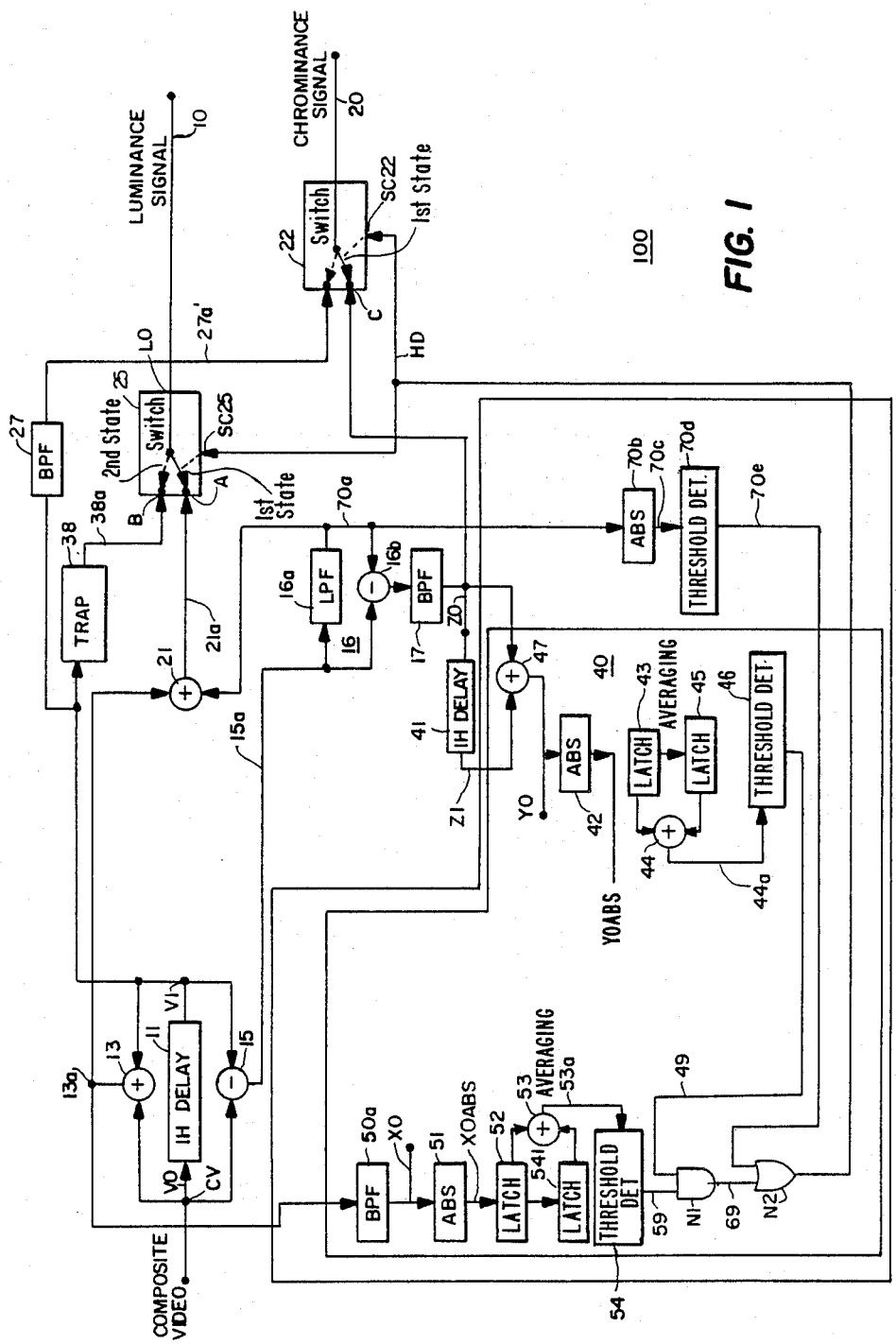
FIG. 1 is a block diagram of a first embodiment of the invention in which comb filtered chrominance and luminance signals are formed in a way that eliminates hanging dot occurrence.

In FIG. 1, a color television receiver apparatus 100, embodying an aspect of the invention, a composite baseband video signal V0, inclusive of a luminance component, and inclusive of a chrominance component comprising sidebands developed by the modulation of a color subcarrier at a frequency $f_{sc}$, appear at an input port or a terminal CV. Signal V0 is supplied to the input of a one horizontal period (1−H) delay line 11. Signal V0 is generated, for example, by coupling the output signal of a conventional analog video detector to an input terminal of an analog-to-digital converter, not shown in the Figures, that forms digital equivalent samples of the video detector output signal at a rate that satisfies the Nyquist sampling criteria such as, for example, $4xf_{sc}$.

A 1−H delayed signal V1, at an output of delay line 11, is additively combined with signal V0 at terminal CV in a signal combiner 13 to form a comb filtered luminance signal 13a and it is also subtractively combined with signal V0 at terminal CV in a signal combiner 15 to form a comb filtered chrominance signal 15a.

The combination of delay line 11 and the subtractive signal combiner 15 forms a first comb filter having a frequency response characteristic exhibiting a succession of response peaks at odd multiples of half the line frequency of the composite signal V0, interspersed with response minima at even multiples of half the line frequency. High frequency components of the output of the first comb filter, falling within the band of frequencies occupied by the chrominance component, are selectively passed by a cascaded arrangement that includes a high-pass filter 16 and a bandpass filter 17 to form a comb filtered chrominance signal Z0. Signal Z0 is coupled to one input of a switch 22 the output of which provides a chrominance signal 20 that is suitable for delivery to the chrominance channel of the receiver. Composite video signal V0 delayed by one horizontal line period and filtered in bandpass filter 27 to provide a non-comb filtered chrominance signal is coupled to a second input of switch 22. Switch 22, responsive to a control signal HD, couples the non-comb filtered chrominance signal and the comb filtered chrominance signal to the chrominance channel in the presence and absence of hanging dots, respectively.

High pass filter 16 is formed, in a conventional manner, by coupling both unfiltered signal 15a and signal 15a, that is low-pass filtered in a low-pass filter 16a, to corresponding input terminals of a subtractor 16b that generates signal Z0.

The combination of delay line 11 and the additive signal combiner 13 forms a second comb filter having a frequency response characteristic exhibiting a succession of response peaks at even multiples of half the line frequency, interspersed with response minima at odd multiples of half the line frequency. The output of signal combiner 13 constitutes a comb filtered luminance signal, substantially free of chrominance component accompaniment, but also undesirably stripped of low frequency components representative of vertical detail. Restoration of vertical detail information to the comb filtered luminance signal is effected by an additional signal combiner 21, which additively combines a signal 13a at the output of signal combiner 13 with a vertical detail signal 70a at an output of low pass filter 16a that forms a vertical detail filter. Vertical detail filter 16a selectively passes the low frequency components of the signal provided by signal combiner 15 to form signal 70a. These components fall within a frequency band below that occupied by the chrominance component.

The output of signal combiner 21, is a comb filtered luminance signal 21, including vertical details, and is normally employed, in the absence of hanging dots as an input luminance signal 10 to the luminance channel of the receiver. For this purpose, the output of signal combiner 21 is coupled to a signal input terminal A of an electronic switch 25. Signal V0 delayed by one horizontal line period and filtered by trap 38 to provide a narrow band luminance signal is coupled to a second input terminal B of switch 25. Switch 25 responsive to control signal HD selectively couples its input terminals A and B to an output terminal L0 to form luminance signal 10 in the absence and presence of hanging dots, respectively.

Comb filtered chrominance signal Z0 is coupled through a 1—H delay 41 to form a 1—H delayed chrominance signal Z1. Signals Z0 and Z1 are representative of two successive lines of video signal within a given picture field. Chrominance signals Z0 and Z1 are summed in a signal combiner (adder 47) that generates an inter-line chrominance difference signal Y0.

Assume, hypothetically, that a given video line of chrominance signal Z0 contains color information that is identical to that in the immediately preceding video line (signal Z1). In this case, signals Z0 and Z1 will sum to zero because of the line-to-line antiphase relationship of the color subcarrier in, for example, the NTSC standard. Therefore, when no chrominance difference occurs between the given video line and the preceding one, that is indicative of the absence of hanging dot condition, signal Y0 will be zero.

On the other hand, when, for example, a portion of a given video line of chrominance signal Z0 is different from the corresponding portion of signal Z1, that is representative of the preceding video line, signal Y0 will be nonzero. Thus, signal Y0 is indicative of inter-line chrominance difference between adjacent video lines. When signal Y0 is nonzero, it may be indicative of the presence of chrominance signal component in comb filtered luminance signal 13a, as described later on.

Signal Y0 is coupled through an absolute value signal forming stage 42 that generates a signal Y0ABS that is representative of the absolute value of signal Y0. Signal Y0ABS is coupled through a signal averager that includes a latch 43, a latch 45 and an adder 44. Adder 44 provides an output signal 44a that is representative of twice the average of the absolute value of two successive samples of signal Y0. The samples of signal Y0 occur at a rate that is equal to, for example, $4xf_{sc}$ Signal 44a is coupled through a threshold detector 46 that generates a signal 49 whenever the magnitude of signal 44a exceeds a corresponding predetermined threshold level. Signal 49 is coupled to a first input terminal of an "AND" gate N1, embodying an aspect of the invention. Signal 49 is indicative of a significant magnitude of inter-line color difference and, consequently, may be indicative of the presence of chrominance signal component in luminance signal 13a, as described later on.

Comb filtered luminance signal 13a is filtered in bandpass filter 50a having a passband between 3 and 4 MHZ to generate a signal X0. Signal X0, which occupies the chrominance spectrum, is coupled through an absolute value signal forming stage 51 that generates a signal X0ABS that is representative of the absolute value of signal X0. Signal X0ABS is coupled through a signal averager that includes a latch 52, a latch 541 and an adder 53 for forming an output signal 53a. Signal 53a is representative of twice the average of the absolute value of two successive samples of signal X0 that occur at, for example, a rate that is equal to $4xf_{sc}$.

Signal 53a is coupled through a threshold detector 54 that generates a signal 59 whenever the magnitude of signal 53a exceeds a corresponding predetermined threshold level. Signal 59 is coupled to a second input terminal of AND gate N1 and is indicative of the presence of a high frequency signal component at a significant magnitude in signal 13a. Signals 59 and 49 are ANDED together in AND gate N1 to produce a signal 69 when both occur simultaneously. Signal 69 is indicative of the occurrence of hanging dot condition. AND gate N1 essentially performs a correlation function to generate correlation signal 69 for hanging dot control.

Signal 69 is coupled to a first input terminal of an "OR" gate N2 that generates signal HD when hanging dot condition occurs. Signal HD is coupled to the control input terminals of switches 22 and 25.

FIGS. 3a, 3b, 3c, 3d and 3e illustrate, schematically, waveforms of the corresponding signals of FIG. 1, during four horizontal intervals, or video lines $H_1$, $H_2$, $H_3$ and $H_4$ of, for example, signal V0 of FIG. 3a. Similar numerals and symbols in FIGS. 1 and 3a–3e indicate similar items or functions.

In FIG. 3a color information is contained in each of video lines $H_1$ and $H_2$ of signal V0 but not in any of horizontal intervals $H_3$ and $H_4$ Therefore an amplitude $A_2$ of signal 15a of FIG. 3b, that is indicative of the sum of the chrominance signal components in video lines $H_2$ and $H_3$ of signal V0 of FIG. 3a, becomes smaller during video line $H_3$ than during video line $H_2$ Likewise, during video line $H_4$, signal 15a becomes even smaller or zero.

The decrease in amplitude $A_2$ of signal 15a or Z0 during video line $H_3$ relative to amplitude $A_1$ that occurs during video line $H_2$ causes signal Y0 of FIG. 3c, that may be indicative of hanging dot occurrence, to be generated during video line $H_3$. Because video line $H_3$ of signal V0 of FIG. 3a does not contain color information but the preceding video line, video line H₂, contains color information, signal X0 of FIG. 3d will be generated during video line H₃ The coincidence occurrences of both signals X0 and Y0 that cause the generation of signal 59 and 49, respectively, of FIG. 1 cause signal HD of FIG. 3e to be generated. Signal HD is, thus, correctly indicative of hanging dot condition occurrence.

Signal 15a or Z0 of FIG. 3b, having amplitude A₂ during video line H₃ that is larger than the zero amplitude during video line H₄, causes signal Y0 of FIG. 3c to be generated, during video line H₄. However, in contrast, to the situation discussed before with respect to video line H₃, during video line H₄ signal Y0 is not indicative of hanging dot condition, as shown in the absence of high frequency signal component in FIG. 3d.

In accordance with an aspect of the invention, "AND" gate N1 of FIG. 1 prevents the generation of control signal HD of FIG. 3e during, for example, video line H₄ of FIG. 3c when signal Y0 is generated but signal X0 of FIG. 3d is not generated. Thus, during video line H₄, luminance signal 10 of FIG. 1, advantageously, remains a comb filtered signal with wide bandwidth even though signal 49 is generated.

Advantageously, signal Y0 is formed when a phase difference occurs between chrominance signals Z0 and Z1, when an amplitude difference occurs between signals Z0 and Z1 or when a combination of both phase and amplitude differences occurs. Thus, the arrangement of FIG. 1 reduces hanging dot condition that occurs when, for example, the color displayed in one scan line is the complementary color of that displayed in the immediately preceding scan line.

Assume that transitions of like polarity occur, at corresponding points, in each of consecutive video line signals of luminance signal 13a. When such luminance signal 13a is displayed in the video display, not shown in the FIGURES, it is manifested as a brightness change in the horizontal direction that forms a brightness transition boundary along a vertical line. Because of, for example, peaking in the frequency response of television receiver stages located upstream of composite video signal V0, luminance signal 13a may contain a high frequency signal component that was not originally present in the composite video signal, as originally received by the television receiver. Such high frequency signal component may appear, in each video line of signal 13a, during a short interval that includes the instant when the aforementioned fast signal transition occurs. It should be understood that, in such situation, the phase of such high frequency signal component, having a frequency that may be, for example, close to the color subcarrier of signal V0, will be the same in each of the aforementioned consecutive video lines of signal 13a. Although such high frequency signal component may be, by a mere coincident, correlative with chrominance signal 15a, it is not indicative of hanging dot occurrence.

Accordingly, it may be desirable to prevent such high frequency signal component from affecting signal Y0 so as to prevent unnecessarily the aforementioned bandwidth reduction in luminance signal 10, since such high frequency signal component does not represent hanging dot occurrence.

Such high frequency signal component, having the same phase in consecutive video lines, will not significantly affect chrominance signal 15a because it will be cancelled in signal combiner 15 by the corresponding portion signal of the preceding video line. Therefore, signal Y0, also, will not be affected. Since signal Y0 and, hence, signal 49 are not affected, generation of signal 59 that may occur because of such high frequency signal component in luminance signal 13a, advantageously, will not affect signal HD that controls switches 25 and 22. It follows that the bandwidth of signal 10, advantageously, will not be reduced; consequently, the resulting displayed picture will maintain the corresponding sharp transition boundary.

Signal 70a that is indicative of vertical detail in composite video signal V0 is coupled to an absolute value signal forming stage 70b to form a signal 70c that is representative of the absolute value of signal 70a. Signal 70c is coupled to an input terminal of a threshold detector 70d that generates a signal 70e whenever the magnitude of signal 70a exceeds a predetermined threshold level. Signal 70e is indicative of a change in the magnitude of the luminance signal between consecutive video lines of composite video signal V0 that exceeds a predetermined magnitude. When such significant changes in the magnitude of the luminance signal occur, they are generally accompanied by line-to-line chrominance differences. See for example, U.S. Pat. No. 4,636,842 entitled COMB FILTER HANGING DOT ELIMINATOR in the name of Hartmeier. Signal 70e is thus another indication of the potential occurrence of hanging dots. Signal 70e is coupled via "OR" gate N2 to form control signal HD.

Figure 2:
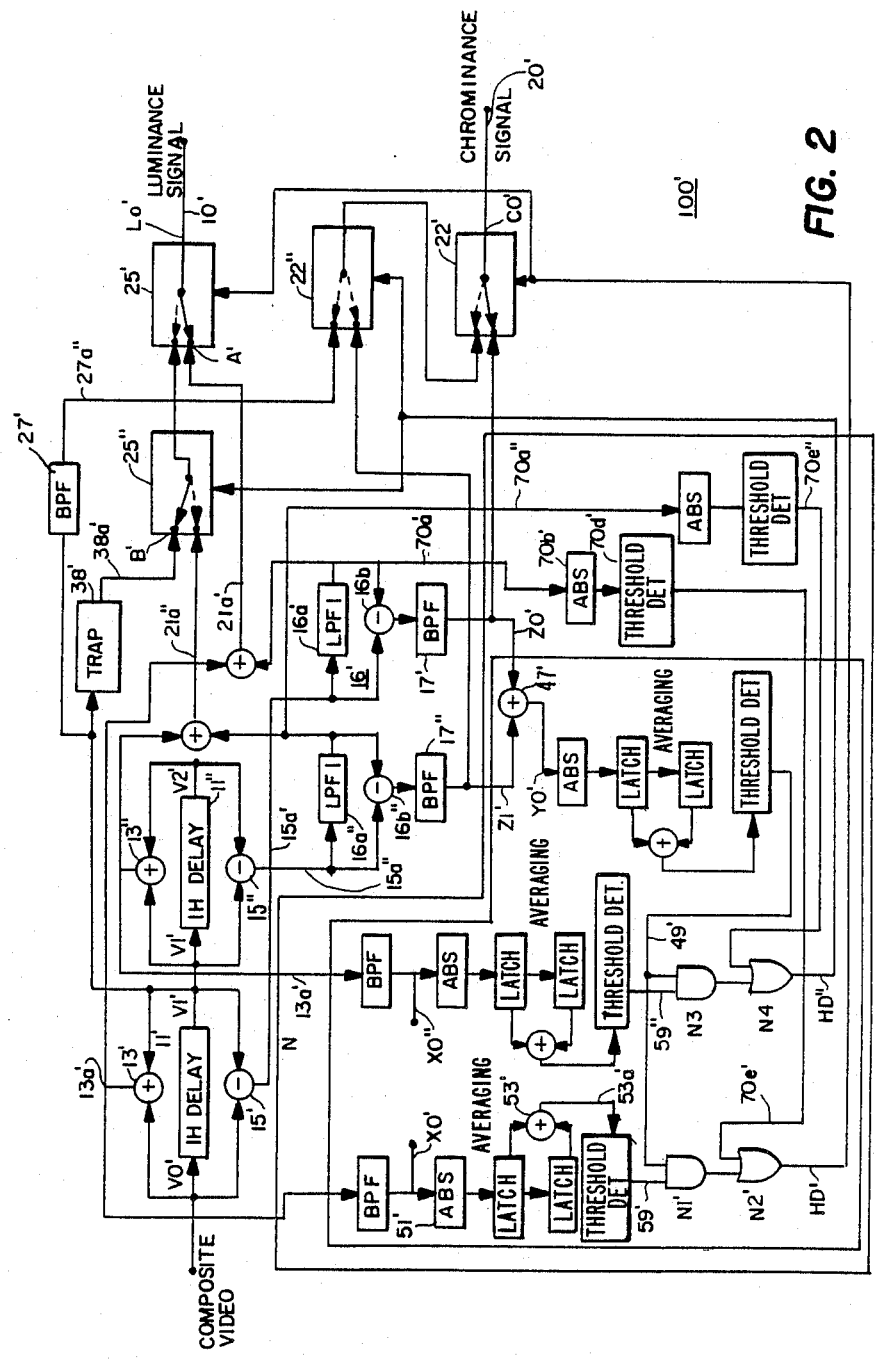
FIG. 2 is a block diagram of a second embodiment of the invention.

FIG. 2 illustrates a television apparatus 100', embodying another aspect of the invention, that also substantially reduces the visibility of hanging dot condition. Similar numbers and symbols in FIGS. 1 and 2 illustrate similar items or functions.

In apparatus 100' of FIG. 2, the following signals are generated in the same manner as the corresponding signals in apparatus 100 of FIG. 1: a comb filtered chrominance signal 15a', a comb filtered luminance signal 21a' of FIG. 2 in which vertical details are restored, a vertical detail signal 70a', a comb filtered chrominance signal Z0', an non-comb filtered luminance signal 38a', a signal 59', a signal 70e' and an non-comb filtered chrominance signal 27a'.

Apparatus 100' of FIG. 2 includes a 1−H delay line 11' having an input terminal that is coupled to signal V1' and an output terminal that forms a signal V2'. In apparatus 100' signals V1' and V2' are used for generating the following signals: a comb filtered chrominance signal 15a", a comb filtered luminance signal 13a", a comb filtered luminance signal 21a" in which vertical details are restored, a vertical detail signal 70a", a comb filtered chrominance signal Z0", a non-comb filtered luminance signal 38a", a signal 59", a signal 70e" and a non-comb filtered chrominance signal 27a". Such signals are generated in a similar manner as the corresponding signals in FIG. 1 having no prime symbol appended, or those in FIG. 2 having, each, a single prime appended. However, the signals with double primes appended are associated with an immediately preceding video line interval.

Signal HD' of FIG. 2 is generated in a similar manner to signal HD of FIG. 1, with the differences noted below. In apparatus 100' of FIG. 2, signal Z1' is generated, as a result of the operation of a low-pass filter 16a", a subtractor 16b" and a band-pass-filter 17" of FIG. 2 that operate similarly to filter 16a, subtractor 16b filter 17, respectively, of FIG. 1. Signal Z1' of FIG.

2 is identical to signal Z1 of FIG. 1. Also, signal HD" of FIG. 2 is generated in similar manner to signal HD' except that signal HD" is indicative of, for example, hanging dot condition in signal 13a" that, relative to signal HD', is associated with the immediately preceding video line interval.

In a first hypothetical situation, signal HD' is not generated. In the first hypothetical situation that corresponds with the absence of, for example, the hanging dot condition in signal 13a', comb filtered signal 21a' that includes vertical details is coupled by a switch 25' to an output terminal L0' of switch 25' to form a luminance signal 10' that is comb filtered. Similarly, a switch 22' couples signal Z0' to form an output chrominance signal 20' that is comb filtered as described before with respect to apparatus 100 of FIG. 1.

In a second hypothetical situation, both signals HD' and HD" of FIG. 2 are generated. In this case, a switch 22" and switch 22' will coupled non-comb filtered chrominance signal 27a" to output terminal C0' of switch 22' to form non-comb filtered chrominance signal 20', as described before with respect to apparatus 100 of FIG. 1. Similarly, non-comb filtered luminance signal 38a' of FIG. 2 will be coupled via a switch 25" and switch 25' to form luminance signal 10' that is non-combed.

In a third hypothetical situation signal HD' is generated, but signal HD" is not. The third situation is indicative of hanging dot condition in signal 13a' and of absence of hanging dot condition in signal 13a". In the third hypothetical situation, advantageously, comb filtered luminance signal 21a", associated with the preceding video line interval, will be coupled to terminal L0' to form luminance signal 10' that is comb filtered. Thus, advantageously, unlike the situation that was discussed with respect to apparatus 100 of FIG. 1, in this case, signal 10' of FIG. 2 will be a wide bandwidth comb filtered signal containing luminance information of the preceding video line. Similarly, chrominance signal 20' will also be a comb filtered signal because switches 22" and 22' couple chrominance signal Z0', associated with the preceding video line, to form comb filtered chrominance signal 20'. In the third hypothetical situation, both signals 10' and 20' may provide a subjectively more pleasing picture than in the corresponding situation that was discussed before with respect to apparatus 100 of FIG. 1.

What is claimed:

1. A television apparatus responsive to a baseband composite input signal for generating an output luminance signal, comprising:
    a comb filter coupled to said input signal for generating, in accordance with luminance information that is contained therein, a first luminance signal that is comb filtered;
    means, responsive to said input signal, for generating, in accordance with chrominance information that is contained in said input signal, first and second chrominance signals, such that said second chrominance signal is time shifted, relative to said first chrominance signal;
    means responsive to said first and second chrominance signals for generating, in accordance with differences therebetween, an inter-line chrominance difference signal;
    means coupled to said comb filter and responsive to said inter-line chrominance difference signal for generating a correlation indicative signal when a signal that is generated in said comb filter is correlative with said inter-line chrominance difference signal; and
    means coupled to said first luminance signal and responsive to said correlation indicative signal for generating, in accordance with said first luminance signal, said output luminance signal such that said correlation indicative signal causes said output luminance signal to vary.

2. An apparatus according to claim 1 further comprising means responsive to said input signal for generating a non-comb filtered luminance signal and wherein said correlation indicative signal generating means comprises a threshold detector responsive to said inter-line chrominance difference signal for generating said correlation indicative signal, in accordance with an output of said threshold detector, said correlation indicative signal being coupled to said output luminance signal generating means for selectively applying as said output luminance signal said non-comb filtered and comb filtered luminance signals when said correlation indicative signal is generated and not generated, respectively.

3. An apparatus according to claim 1 further comprising, means responsive to said first inter-line chrominance difference signal for generating a second inter-line chrominance difference signal such that each value of said second inter-line chrominance difference signal is representative of an average of portions of said first inter-line chrominance difference signal within a given video line of said first inter-line chrominance difference signal and wherein said correlation indicative signal generating means is responsive to said second inter-line chrominance difference signal.

4. An apparatus according to claim 1 wherein said first and second chrominance signals generating means comprises a second comb filter.

5. An apparatus according to claim 4 wherein said second comb filter comprises a 1−H delay line.

6. An apparatus according to claim 1 wherein said output luminance signal generating means, is responsive to an increase of the magnitude of said inter-line chrominance difference signal to reduce the frequency spectrum of said output luminance signal.

7. An apparatus according to claim 1 wherein said correlation indicative signal generating means comprises, a filter responsive to said comb filtered first luminance signal for generating a luminance third signal occupying a frequency spectrum corresponding to a higher frequency spectrum portion of said comb filtered first luminance signal and means responsive to said third signal and to said inter-line chrominance difference signal for generating said correlation indicative signal when said third signal is correlative with said inter-line chrominance difference signal.

8. An apparatus according to claim 7 further comprising, first and second threshold detectors responsive to said third and inter-line chrominace difference signals, respectively, for generating, when each exceeds a corresponding predetermined magnitude, corresponding fourth and fifth signals, wherein said correlation indicative signal generating means is responsive to said fourth and fifth signals for generating said correlation indicative signal when both said fourth and fifth signals are generated.

9. An apparatus according to claim 8 wherein said fourth and fifth signals are coupled to a logic gate that generates said first control signal when said fourth and fifth signals occur concurrently.

10. An apparatus according to claim 1 further comprising, a low-pass filter responsive to said first chrominance signal for generating a third signal that contains vertical details of said input signal and a threshold detector responsive to said third signal for generating a first control signal that is coupled to said output luminance signal generating means that causes a reduction in a high frequency portion of a frequency spectrum of said output luminance signal when said third signal exceeds a predetermined magnitude.

11. An apparatus according to claim 1 further comprising, means responsive to said first chrominance signal for generating, in accordance with said correlation indicative signal, a third chrominance signal that varies in accordance with said correlation indicative signal.

12. An apparatus according to claim 1 wherein said correlation indicative signal substantially eliminates the occurrence of hanging dot condition.

13. An apparatus according to claim 1 wherein said correlation indicative signal generating means comprises means responsive to said inter-line chrominance difference signal for generating a signal that is indicative of an absolute value of said chrominance difference indicative signal.

14. An apparatus according to claim 1 wherein said output luminance signal generating means comprises a switch that couples, in a first state thereof, said combed first luminance signal to an output terminal of said switch when said inter-line chrominance difference signal is at a magnitude that is smaller than a predetermined magnitude and that couples an uncombed luminance signal that is derived from said input signal at a second state of said switch.

15. An apparatus according to claim 1 further comprising, means responsive to said input signal and coupled to said output luminance signal generating means for restoring vertical details, in said output luminance signal that are lost when said first luminance signal is generated.

16. An apparatus according to claim 1 wherein said comb filter comprises a line comb filter.

17. An apparatus according to claim 1 wherein said inter-line chrominance difference signal is within an upper frequency range normally occupied by chrominance information of said input signal and wherein luminance information contained in such upper frequency range of said input signal is substantially removed from said inter-line chrominance difference signal.

18. A television apparatus responsive to a composite input signal for generating an output luminance signal comprising:
  means, including a comb filter, responsive to said input signal for generating first and second luminance signals that are comb filtered such that during a given video line interval of said input signal, said first and second luminance signals contain luminance information that is obtained from correspondingly different video lines of said input signal;
  means, responsive to said input signal, for generating, in accordance with a chrominance component signal that is contained in said input signal, first and second chrominance signals that contain chrominance information of different video lines of said input signal;
  means responsive to said first and second chrominance signals for generating, in accordance with differences therebetween, an inter-line chrominance difference signal that is indicative of a difference between a color represented by said first chrominance signal and a color represented by said second chrominance signal;
  means coupled to said first and second luminance signals and responsive to said inter-line chrominance difference signal for generating, in accordance therewith, first and second control signals, said first control signal being indicative of an occurrence of hanging dot condition in said first luminance signal and said second control signal being indicative of a corresponding occurrence of hanging dot condition in said second luminance signal; and
  means coupled to said first and second luminance signals and responsive to said first and second control signals for generating said output luminance signal in accordance therewith such that, when a hanging dot condition occurs in one of said first and second luminance signals, but not in the other one of said first and second luminance signals, said output luminance signal is generated in accordance with the other one, and vice versa.

19. An apparatus according to claim 18 further comprising, a source of a third luminance signal, wherein said output luminance signal generating means comprises switching means that couples to an output terminal thereof where said output luminance signal is formed, said first luminance signal when said first control signal is generated, that couples thereto said second luminance signal when said first control signal is generated provided said second control signal is no generated and that couples thereto said third luminance signal when both said first and second control signals are generated.

20. A television apparatus responsive to a baseband composite input video signal for generating an output video signal, comprising:
  a first comb filter coupled to said input video signal for generating, in accordance with luminance information that is contained therein, a first luminance signal that is comb filtered;
  means, responsive to said input video signal, for generating, in accordance with a chrominance component signal that is contained in said input video signal, first and second chrominance signals such that first and second chrominance signals contain chrominance information of different video lines of said input signal;
  means responsive to said first and second chrominance signals for generating, in accordance with a difference therebetween, a comb filtered, inter-line chrominance difference signal at a frequency that is within a frequency range normally occupied by a chrominance component of said input video signal and that is indicative mainly of a difference between a color represented by said first chrominance signal and a color represented by said second chrominance signal such that any luminance information is substantially removed from said inter-line chrominance difference signal;
  means responsive to said inter-line chrominance difference signal and to said first luminance signal for generating a correlation indicative signal when the two signals that are applied thereto are correlated; and
  means responsive to said correlation indicative signal and to said input video signal for generating said output video signal that contains picture information derived from said input video signal and that varies in accordance with said correlation indicative signal.

21. An apparatus according to claim 20 wherein said output video signal generating means is responsive to said first luminance signal for generating said output video signal that is a comb filtered luminance signal when said correlation indicative signal is at a first state thereof and that is a non-comb filtered luminance signal when said correlation indicative signal is at a second state thereof.

* * * * *